(12) United States Patent
Iwama et al.

(10) Patent No.: US 10,564,273 B2
(45) Date of Patent: Feb. 18, 2020

(54) ULTRASONIC DIAGNOSTIC APPARATUS

(71) Applicant: TOSHIBA MEDICAL SYSTEMS CORPORATION, Otawara-Shi (JP)

(72) Inventors: Nobuyuki Iwama, Nasushiobara (JP); Yuhei Fukuo, Nasushiobara (JP); Koichi Morikawa, Nasushiobara (JP); Wataru Kameishi, Nasushiobara (JP); Isao Uchiumi, Nasushiobara (JP); Hiroyuki Shibanuma, Yaita (JP)

(73) Assignee: Canon Medical Systems Corporation, Otawara-shi (JP)

( * ) Notice: Subject to any disclaimer, the term of this patent is extended or adjusted under 35 U.S.C. 154(b) by 183 days.

(21) Appl. No.: 15/247,186

(22) Filed: Aug. 25, 2016

(65) Prior Publication Data

US 2017/0115383 A1    Apr. 27, 2017

(30) Foreign Application Priority Data

Oct. 21, 2015  (JP) .................................. 2015-207188
Jun. 10, 2016  (JP) .................................. 2016-116073

(51) Int. Cl.
*G01S 7/52* (2006.01)
*G01S 15/89* (2006.01)

(52) U.S. Cl.
CPC ...... *G01S 7/52077* (2013.01); *G01S 7/52046* (2013.01); *G01S 15/8988* (2013.01)

(58) Field of Classification Search
None
See application file for complete search history.

(56) References Cited

U.S. PATENT DOCUMENTS

| | | | | |
|---|---|---|---|---|
| 4,388,830 A | * | 6/1983 | Narushima | ........... G01L 317/02 73/597 |
| 4,850,363 A | * | 7/1989 | Yanagawa | ................ A61B 8/12 600/445 |
| RE34,964 E | * | 6/1995 | Okazaki | ........................ 600/439 |
| 2003/0210609 A1 | * | 11/2003 | Jeffryes | .................. G01V 1/005 367/14 |
| 2009/0018442 A1 | * | 1/2009 | Miller | ................. G01S 7/52077 600/437 |

FOREIGN PATENT DOCUMENTS

JP    2011-217842    11/2011

* cited by examiner

*Primary Examiner* — Hovhannes Baghdasaryan
(74) *Attorney, Agent, or Firm* — Oblon, McClelland, Maier & Neustadt, L.L.P.

(57) ABSTRACT

An ultrasonic diagnostic apparatus according to a present embodiment includes a transmission circuit, a reception circuit, a data processing circuit, an image generating circuit, a switching power supply circuit, and a control circuit. The switching power supply circuit is configured to generate a drive voltage for at least one of the transmission circuit, the reception circuit, the data processing circuit, and the image generating circuit. The control circuit is configured to control the transmission circuit to repeatedly transmit an ultrasonic pulse, and control a timing of a switching operation of the switching power supply circuit to synchronize the timing with a transmission timing or a reception timing of the ultrasonic pulse.

16 Claims, 8 Drawing Sheets

ULTRASONIC DIAGNOSTIC APPARATUS

CROSS-REFERENCE TO RELATED APPLICATION

This application is based upon and claims the benefit of priority from Japanese Patent Application No. 2015-207188, filed on Oct. 21, 2015, and Japanese Patent Application No. 2016-116073, filed on Jun. 10, 2016, the entire contents of each of which are incorporated herein by reference.

FIELD

An embodiment as an aspect of the present invention relates to an ultrasonic diagnostic apparatus.

BACKGROUND

In an ultrasonic diagnostic apparatus of recent years, a linear power supply, such as a dropper and a series regulator, with little noise is often used as a power supply of a substrate and the like. However, conversion efficiency of the linear power supply is poor. Heat generation and mounting area of the linear power supply are large, and the cost is high in some cases.

Therefore, a switching power supply with a high conversion efficiency and low cost is used in some cases as a power supply of an ultrasonic diagnostic apparatus of recent years. The switching power supply is a power supply that generates arbitrary different voltages by switching on and off a transistor. The number of times that the transistor is switched per second is called a switching frequency.

However, the switching power supply generates noise every time a switching operation is performed. There is a problem that the generated switching noise is mixed in a signal in an analog circuit or the like of the ultrasonic diagnostic apparatus, and image noise is generated in an ultrasonic image.

Examples of a technique of reducing the image noise include a method of using a shield to cover the switching power supply that is a source of noise and a method of incorporating a low-pass filter using analog elements of RLC into a power output. In addition, an example of a technique of resolving high-frequency noise includes a method of synchronizing a frequency of switching operation with an integral multiple of a transmission timing frequency of a transmission pulse to thereby adjust a noise phase and execute correlation processing to cancel Doppler noise.

An object of the present invention is to provide an ultrasonic diagnostic apparatus that removes image noise caused by a switching operation of switching power supply circuitry.

BRIEF DESCRIPTION OF THE DRAWINGS

In accompanying drawings.

DETAILED DESCRIPTION

An ultrasonic diagnostic apparatus according to the present embodiments will be described with reference to the attached drawings.

The ultrasonic diagnostic apparatus according to the present embodiment includes a transmission circuit, a reception circuit, a data processing circuit, an image generating circuit, a switching power supply circuit, and a control circuit. The transmission circuit is configured to repeatedly transmit an ultrasonic pulse through an ultrasonic probe. The reception circuit is configured to receive, as a reception signal, a reflected wave corresponding to the ultrasonic pulse received through the ultrasonic probe. The data processing circuit is configured to execute data processing for generating an ultrasonic image based on the reception signal. The image generating circuit is configured to generate the ultrasonic image based on the reception signal processed by the data processing circuit. The switching power supply circuit is configured to generate a drive voltage for at least one of the transmission circuit, the reception circuit, the data processing circuit, and the image generating circuit. The control circuit is configured to control the transmission circuit to repeatedly transmit the ultrasonic pulse, and control a timing of a switching operation of the switching power supply circuit to synchronize the timing with a transmission timing or a reception timing of the ultrasonic pulse.

1. First Embodiment

Figure 1:
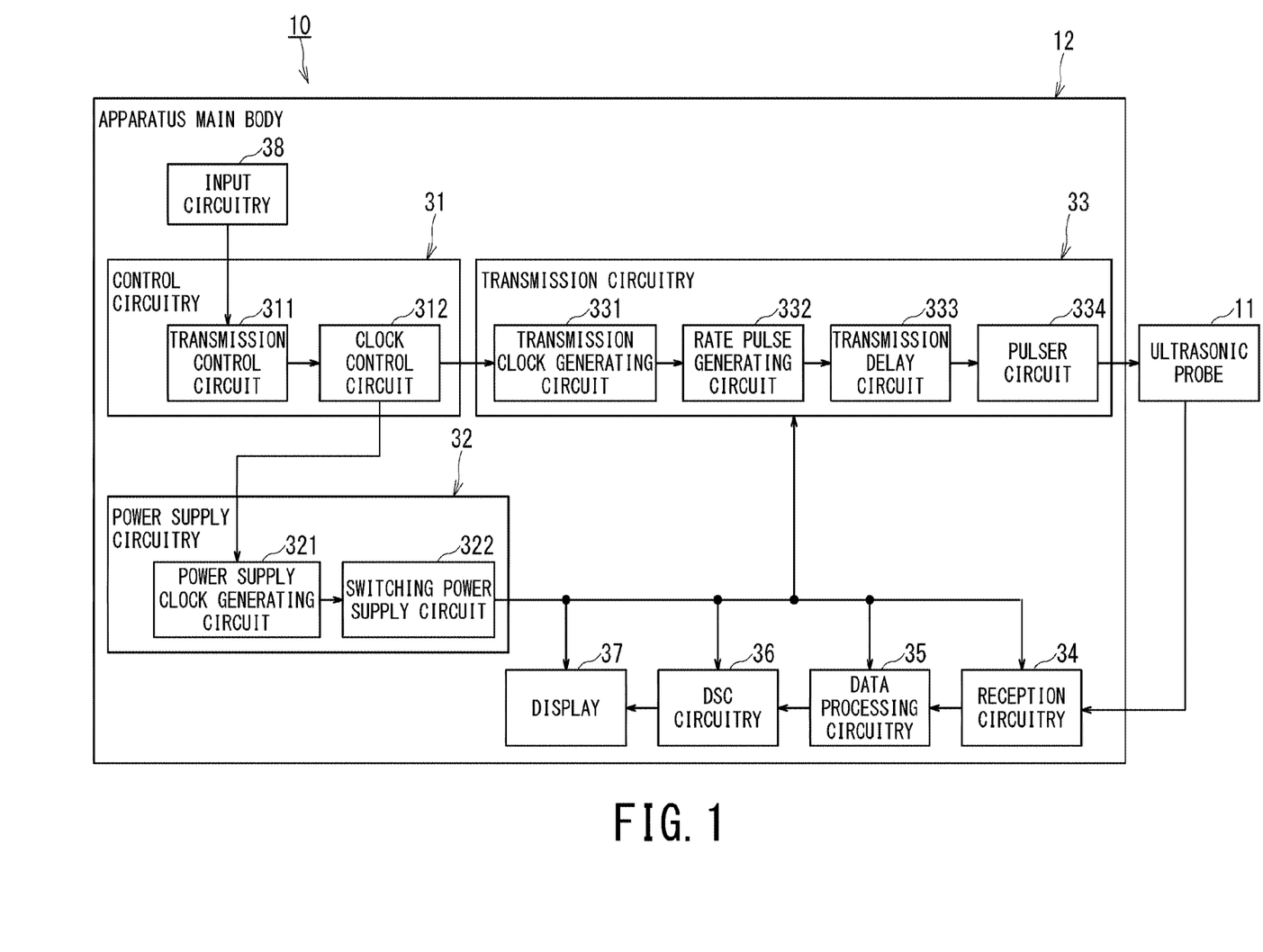
FIG. 1 is a schematic diagram showing a configuration of an ultrasonic diagnostic apparatus according to a first embodiment.

FIG. 1 is a schematic diagram showing a configuration of an ultrasonic diagnostic apparatus according to a first embodiment.

FIG. 1 shows an ultrasonic diagnostic apparatus 10 according to the first embodiment. The ultrasonic diagnostic apparatus 10 includes an ultrasonic probe 11 and an apparatus main body 12. The apparatus main body 12 is called an ultrasonic diagnostic apparatus in some cases, and in that case, the ultrasonic diagnostic apparatus is connected to an ultrasonic probe provided outside of the ultrasonic diagnostic apparatus.

The ultrasonic probe 11 transmits and receives an ultrasonic wave to and from an object (for example, patient). A front surface of the ultrasonic probe 11 is brought into contact with a surface of the object to transmit and receive the ultrasonic wave, and a tip portion of the ultrasonic probe 11 is provided with one-dimensionally or two-dimensionally arranged minute vibrators. The vibrators are also called piezoelectric elements. The vibrators are electroacoustic conversion elements with a following function. During transmission, the vibrators convert an electrical pulse into a transmission pulse that is an ultrasonic pulse. During reception, the vibrators convert a reflected wave corresponding to the transmission pulse into an electrical signal and transmit the electrical signal as a reception signal to the apparatus main body 12.

The ultrasonic probe 11 is small and light and is connected to the apparatus main body 12 through a cable. Examples of the ultrasonic probe 11 include a sector scanning probe, a linear scanning probe, and a convex scanning probe, and the ultrasonic probe 11 is arbitrarily selected according to a site to be diagnosed.

The apparatus main body 12 includes a control unit (for example, control circuitry) 31, a power supply unit (for example, power supply circuitry) 32, a transmission unit (for example, transmission circuitry) 33, a reception unit (for example, reception circuitry) 34, a data processing unit (data processing circuitry) 35, an image generating unit (for example, DSC circuitry) 36, a display unit (for example, a display) 37, and an input unit (for example, input circuitry) 38. In some cases, functions of part or all of digital circuitry including the transmission unit 33, the reception unit 34, the data processing unit 35, and the image generating unit 36 are realized by software for causing a processor to execute programs saved in a predetermined memory. The functions of the transmission unit 33, the reception unit 34, the data processing unit 35, and the image generating unit 36 are realized by the digital circuitry in the description here. Examples of the digital circuitry include a simple programmable logic device (SPLD), a complex programmable logic device (CPLD), and a field programmable gate array (FPGA).

The control circuitry 31 controls the power supply circuitry 32, the transmission circuitry 33, the reception circuitry 34, the data processing circuitry 35, the DSC circuitry 36, and the display 37 based on various setting requests input by an operator through the input circuitry 38 or various control programs and various data read from an internal memory (not shown). The control circuitry 31 also controls the display 37 to display an ultrasonic image. The control circuitry 31 also controls a memory circuitry (not shown), such as an internal memory, to store the ultrasonic image.

The control circuitry 31 includes a transmission control circuit 311 and a clock control circuit 312. The transmission control circuit 311 determines a repetition frequency of an ultrasonic pulse (PRF: pulse repetition frequency) based on transmission conditions or the like set by the operator through the input circuitry 38.

The clock control circuit 312 controls the transmission circuitry 33 to repeatedly transmit a transmission pulse based on a clock signal (hereinafter, called "transmission clock signal") indicating a transmission timing of the transmission pulse according to the PRF determined by the transmission control circuit 311. The clock control circuit 312 controls the power supply circuitry 32 to synchronize a phase of a clock signal (hereinafter, called "power supply clock signal") indicating a timing of a switching operation of a switching power supply circuit 322 described later, with a phase of the transmission clock signal. More specifically, the clock control circuit 312 controls the power supply circuitry 32 to synchronize an initial phase of the power supply clock signal with the transmission clock signal.

The power supply circuitry 32 includes a power supply clock generating circuit 321 and a switching power supply circuit (DC-DC equivalent circuit) 322. The power supply clock generating circuit 321 generates a power supply clock signal (for example, DC-CL shown in FIGS. 5 to 7, 9, and 10) under the control of the clock control circuit 312. More specifically, the power supply clock generating circuit 321 generates a power supply clock signal to switch on or off a switching element, such as a transistor, of the switching power supply circuit 322 to thereby generate a desirable voltage.

The power supply clock generating circuit 321 is not limited to the circuitry that switches the switching element of the switching power supply circuit 322 that is an on-board power supply on a printed circuitry board. The power supply clock generating circuit 321 may be a circuitry that switches a switching element of an AC-DC circuitry or a DC-DC circuitry included in a power supply unit (PSU).

The switching power supply circuit 322 generates a drive voltage for at least one of the transmission circuitry 33, the reception circuitry 34, the data processing circuitry 35, and the DSC circuitry 36. In addition, the switching power supply circuit 322 may also generate a drive voltage for the display 37. When the switching power supply circuit 322 generates the drive voltage for the transmission circuitry 33, the reception circuitry 34, the data processing circuitry 35, the DSC circuitry 36, and the display 37, multiple switching power supply circuits 322 that generate different drive voltages for the constituent members may be connected. The switching power supply circuits 322 may be mounted on substrates for the constituent elements of the ultrasonic diagnostic apparatus 10.

Figure 2:
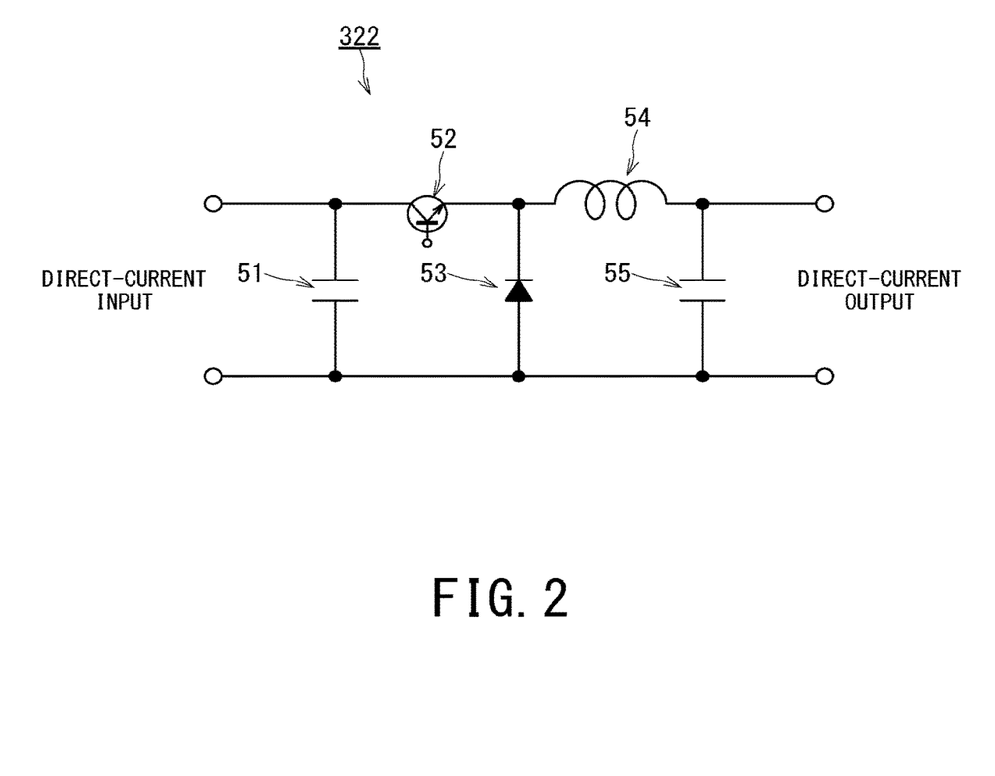
FIG. 2 is a diagram showing an example of a structure of a switching power supply circuit.

FIG. 2 is a diagram showing an example of a structure of the switching power supply circuit 322.

The switching power supply circuit 322 receives a direct current from an AC-DC converter circuitry (not shown). The switching power supply circuit 322 includes an input capacitor 51, a transistor 52, a diode 53, a power inductor 54, and an output (smoothing) capacitor 55. When the transistor 52 is turned on based on the power supply clock signal generated by the power supply clock generating circuit 321 (shown in FIG. 1), energy is stored in the power inductor 54 by a current flowing from an input to an output.

On the other hand, when the transistor 52 is turned off, the power inductor 54 generates electromotive force to maintain the current. The current flows through the diode 53, and the current is output.

Based on the operating principle of the switching system, the voltage and the current intermittently change when the transistor 52 of the switching power supply circuit 322 is turned on and off. Therefore, a noise source including high frequency components is superimposed on a reception signal that is a weak analog signal. As a result, a problem occurs, such as generation of image noise. Particularly, the problem of the image noise becomes prominent in a color Doppler mode.

Figure 5:
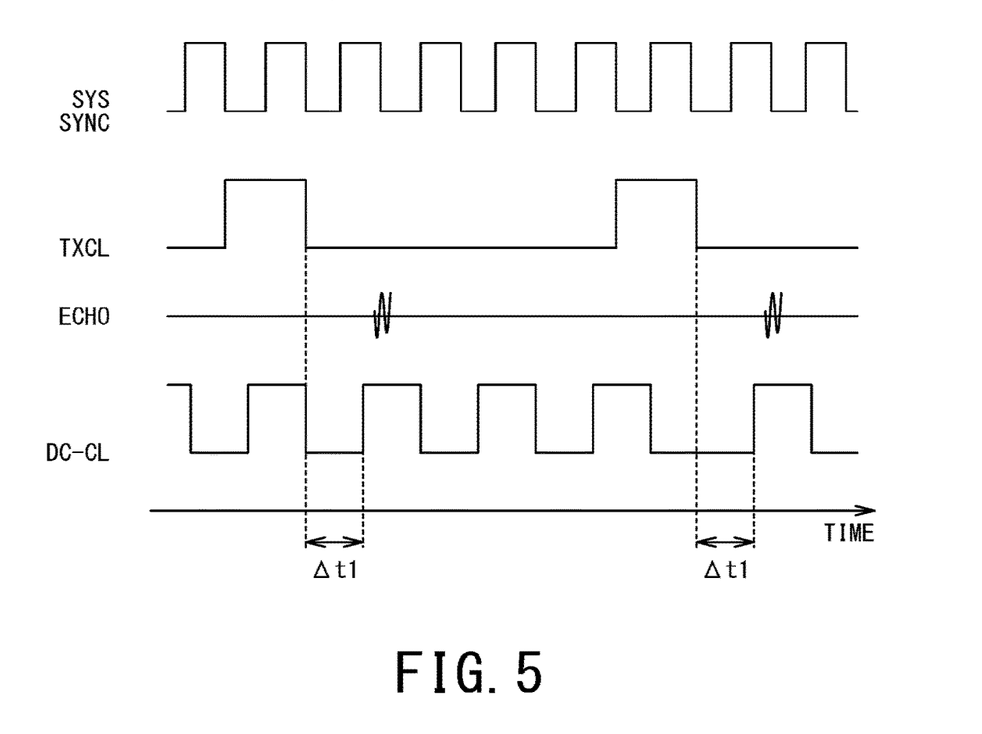
FIG. 5 is a diagram showing an example of a power supply clock signal according to the first embodiment.
Figure 6:
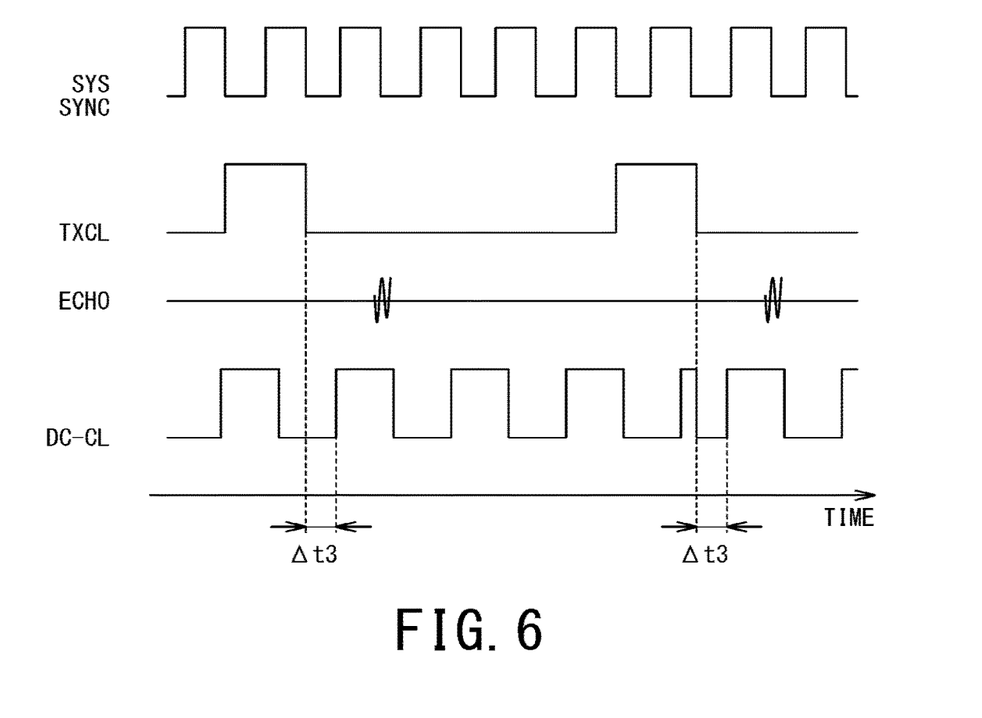
FIG. 6 is a diagram showing an example of a power supply clock signal according to the first embodiment.
Figure 7:
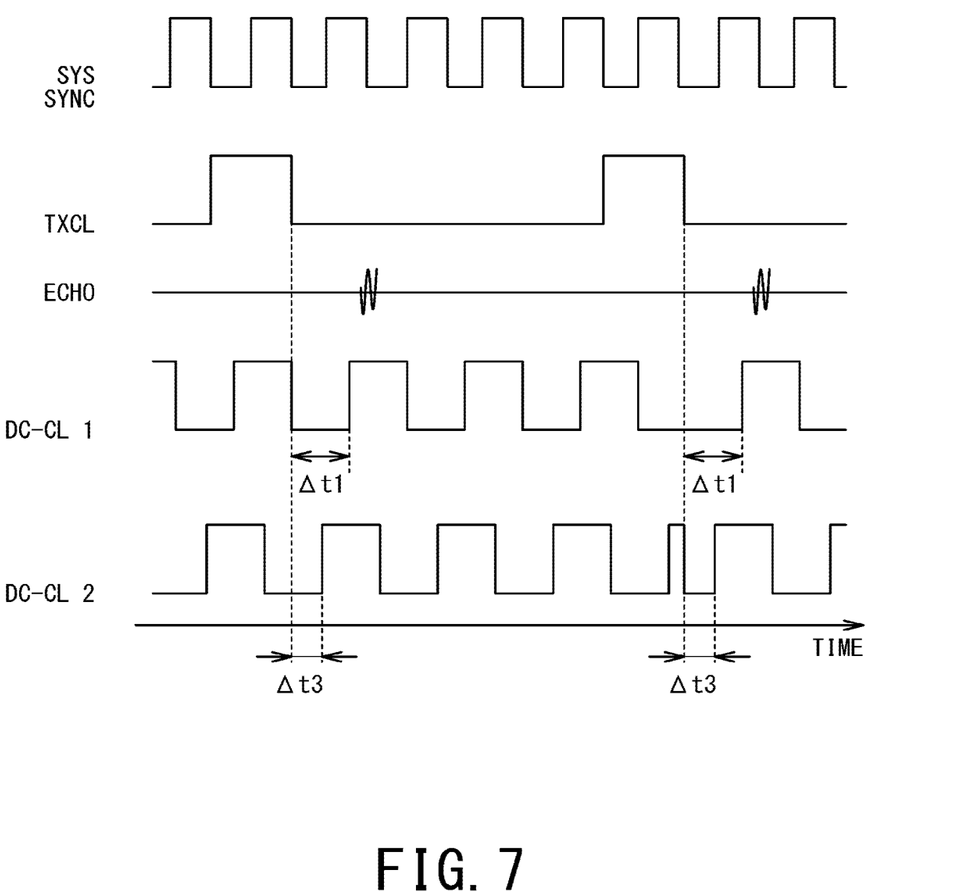
FIG. 7 is a diagram showing an example of a power supply clock signal according to the first embodiment.

Therefore, the timing of the switching operation of the transistor 52 is controlled in the switching power supply circuit 322 as shown in FIGS. 5 to 7, under the control by the power supply clock generating circuit 321 (shown in FIG. 1).

With reference again to FIG. 1, the transmission circuitry 33 receives power from the power supply circuitry 32 to operate. The transmission circuitry 33 includes a transmission clock generating circuit 331, a rate pulse generating circuit 332, a transmission delay circuit 333, and a pulser circuit 334. The transmission clock generating circuit 331 generates a transmission clock signal (for example, TXCL shown in FIGS. 5 to 7) under the control by the clock control circuit 312. The rate pulse generating circuit 332 generates a rate pulse for determining a transmission rate of an ultrasonic wave according to the transmission clock signal generated by the transmission clock generating circuit 331. The transmission rate of the ultrasonic wave denotes the number of ultrasonic pulses transmitted per second.

The transmission delay circuit 333 generates a delay drive signal by providing an appropriate delay necessary for the rate pulse in order to determine a directivity of the ultrasonic wave. The delay drive signal is also called a trigger pulse. In synchronization with the phase of the delay drive signal, the pulser circuit 334 individually applies high-frequency signal pulses with a center frequency fo to the vibrators of the ultrasonic probe 11 or applies the pulses to vibrators in neighborhood groups. The vibrators of the ultrasonic probe 11 receive the signal pulses and mechanically vibrate. As a result, transmission pulses with the center frequency f0 are generated, and the transmission pulses are emitted to the object.

The reception circuitry 34 receives power from the power supply circuitry 32 to operate. The reception circuitry 34 includes a preamplifier, an analog to digital (A/D) conversion circuit, a reception delay circuit, and an adding circuit not shown. The preamplifier includes channels and amplifies minute signals converted by the vibrators into electrical reception signals to ensure a sufficient S/N (signal to noise). The reception signals of the channels amplified to a predetermined size by the preamplifier are converted to digital signals by the A/D conversion circuit, and the digital signals are transmitted to the reception delay circuit. The reception delay circuit provides a focusing delay time for focusing an ultrasonic reflected wave from a predetermined depth and a deflection delay time for setting a reception directivity with respect to a predetermined direction, to each of the reception signals of the channels output from the A/D conversion circuit. The adding circuit phases and adds the reception signals from the reception delay circuit, i.e. adjusts and adds the phases of the reception signals obtained from a predetermined direction.

The data processing circuitry 35 receives power from the power supply circuitry 32 to operate. The data processing circuitry 35 applies data processing for generating an ultrasonic image to a reception signal input from the reception circuitry 34. For example, the data processing circuitry 35 executes B mode (Brightness mode) processing, such as logarithmic compression processing and envelope detection processing, Doppler processing, such as orthogonal detection processing and filter processing, and the like.

The DSC (digital scan converter) circuitry 36 receives power from the power supply circuitry 32 to operate. The DSC circuitry 36 converts B mode data and Doppler data generated for each scanning direction by the data processing circuitry 35 into scanning line signal sequences in a general video format, such as for a television, and generates an ultrasonic image as a display image. The generated ultrasonic image is output as a video signal to the display 37.

The display 37 receives power from the power supply circuitry 32 to operate. The display 37 includes a general display output apparatus, such as a liquid crystal display and an OLED (organic light emitting diode) display, and displays the ultrasonic image generated by the DSC circuitry 36.

The input circuitry 38 is circuitry for inputting a signal from an input device, such as a pointing device like a mouse operable by the operator and a keyboard, and the input device is also included in the input circuitry 38 here. When the operator operates the input device, the input circuitry 38 generates an input signal according to the operation and outputs the input signal to the control circuitry 31. Note that the apparatus main body 12 may include a touch panel in which the input device and the display 37 are integrated.

In some cases, the apparatus main body 12 includes memory circuitry not shown formed by a semiconductor memory element, such as a RAM (random access memory) and a flash memory. The memory circuitry stores data necessary for executing programs, ultrasonic images, and the like.

Action of the ultrasonic diagnostic apparatus 10 according to the first embodiment will be described.

Figure 3:
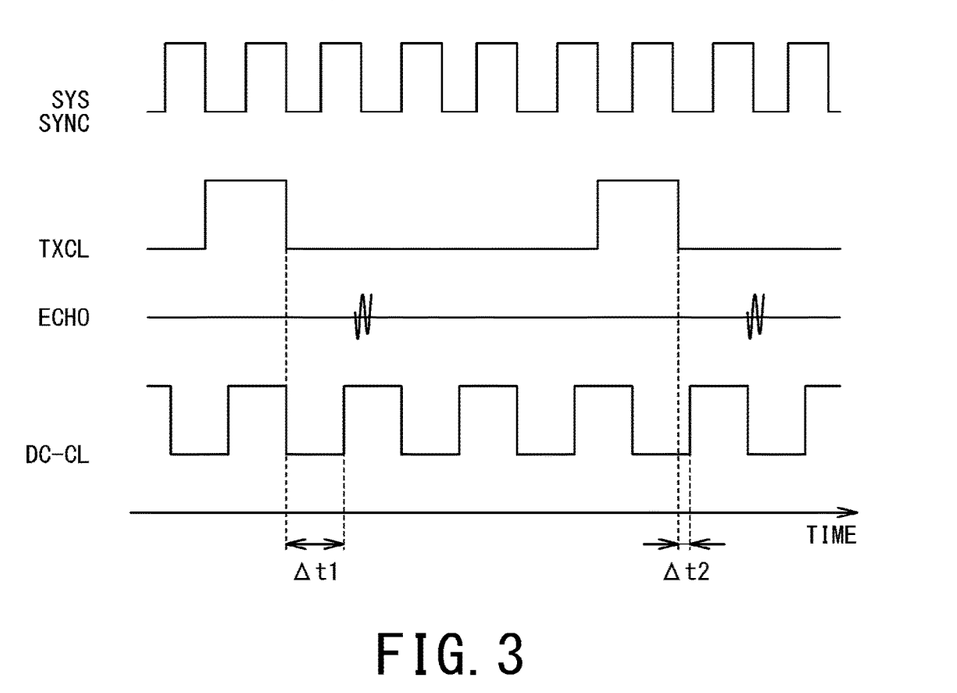
FIG. 3 is a diagram showing a conventional power supply clock signal.
Figure 4:
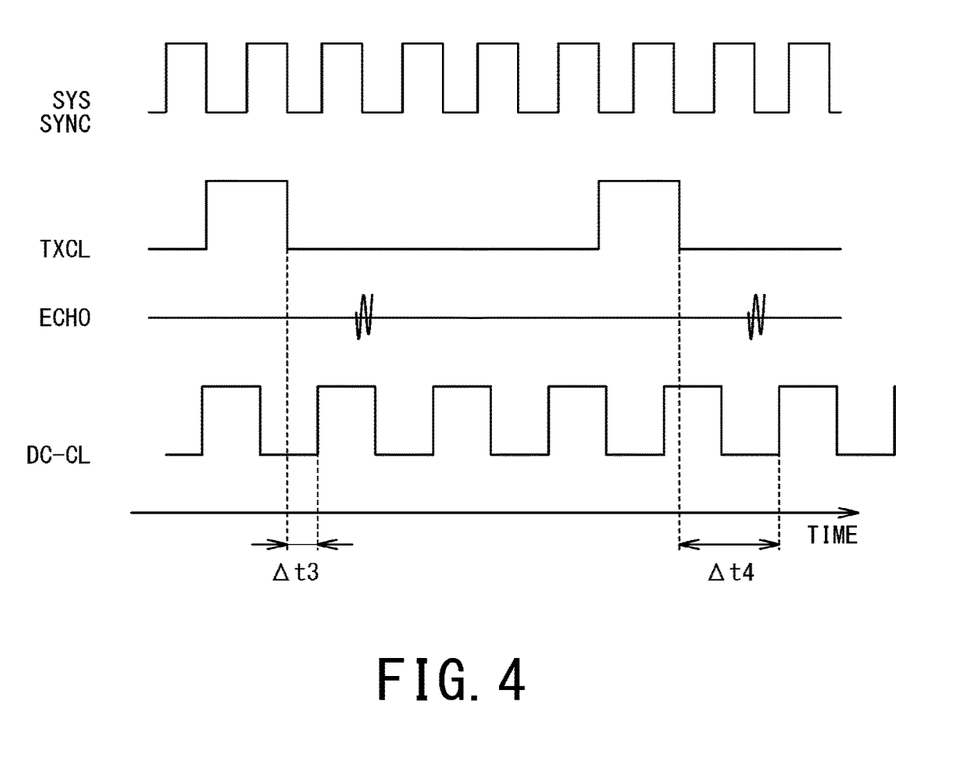
FIG. 4 is a diagram showing a conventional power supply clock signal.

Each of FIGS. 3 and 4 is a diagram showing a conventional power supply clock signal.

A first row of each of FIGS. 3 and 4 illustrates a system synchronization (SYS SYNC) signal for controlling the entire ultrasonic diagnostic apparatus. A second row of each of FIGS. 3 and 4 illustrates a transmission clock (TXCL) signal indicating a transmission timing of a transmission pulse. A third row of each of FIGS. 3 and 4 illustrates a reception (ECHO) signal based on a reflected wave corresponding to the transmission pulse. A fourth row of each of FIGS. 3 and 4 illustrates a power supply clock (DC-CL) signal indicating a timing of a switching operation in the switching power supply circuit.

In FIG. 3, $\Delta t1$ denotes a time difference between a fall of the transmission clock signal of a transmission pulse at a certain time and a rise of the power supply clock signal. In this case, a time difference between a rise of the transmission clock signal of a next transmission pulse and a rise of the power supply clock signal is $\Delta t2$ ($\Delta t2 \neq \Delta t1$), due to a relationship between a phase period of the transmission clock signal and a phase period of the power supply clock signal.

In FIG. 4, $\Delta t3$ denotes a time difference between a fall of the transmission clock signal of a transmission pulse at a certain time and a rise of the power supply clock signal. In this case, a time difference between a rise of the transmission clock signal of a next transmission pulse and a rise of the power supply clock signal is $\Delta t4$ ($\Delta t4 \neq \Delta t3$), due to a relationship between the phase period of the transmission clock signal and the phase period of the power supply clock signal.

In the conventional technique shown in FIGS. 3 and 4, the transistor is alternately and repeatedly turned on and off according to the power supply clock signals at constant intervals based on a switching frequency. The switching frequency denotes the number of times that the transistor of the switching power supply circuit is switched per second. Therefore, the power supply clock signal is asynchronous with the transmission clock signal, and the position of image noise is random.

To solve the problem in the conventional technique, a shield or a low-pass filter may be added to the switching power supply circuit to reduce the switching noise. However, an increase in circuit components inevitably increases the size and cost of the ultrasonic diagnostic apparatus. The solution is a reduction process of the image noise on the ultrasonic image, and there is a drawback that the image noise is completely removed.

Although the switching noise may be reduced in the method of frequency synchronization in the conventional technique, the switching frequency is limited to an integral multiple of the transmission timing frequency of the transmission pulse, and an algorithm for calculating the frequencies to synchronize the phases is necessary.

The power supply clock signal according to the first embodiment will be described with reference to FIGS. 5 to 7.

Each of FIGS. 5 and 6 is a diagram showing an example of a power supply clock signal according to the first embodiment.

FIGS. 5 and 6 illustrate one type of power supply clock signal with one type of phase period. When there are multiple switching power supply circuits 322, all of the switching power supply circuits 322 are controlled by one type of power supply clock signal. Alternatively, when there are multiple switching power supply circuits 322, one or more of the switching power supply circuits 322 are controlled by one type of power supply clock signal.

A first row of each of FIGS. 5 and 6 illustrates a system synchronization (SYS SYNC) signal for controlling the entire ultrasonic diagnostic apparatus 10. A second row of each of FIGS. 5 and 6 illustrates a transmission clock (TXCL) signal indicating a transmission timing of the transmission pulse. A third row of each of FIGS. 5 and 6 illustrates a reception (ECHO) signal based on a reflected wave corresponding to the transmission pulse. A fourth row of each of FIGS. 5 and 6 illustrates a power supply clock (DC-CL) signal indicating a timing of the switching operation in the switching power supply circuit 322 (shown in FIG. 1).

A phase period of the power supply clock signal shown in FIG. 5 corresponds to that of the conventional power supply clock signal shown in FIG. 3. Furthermore, the phase of the power supply clock signal with the phase period based on the switching frequency is synchronized with the phase of the transmission clock signal in FIG. 5. More specifically, intervals of the power supply clock signals are adjusted such that time differences between falls of the transmission clock signals and rises of corresponding power supply clock signals become constant Δt1. A value of the time difference Δt1 can be arbitrarily determined.

A phase period of the power supply clock signal shown in FIG. 6 corresponds to that of the conventional power supply clock signal shown in FIG. 4. Furthermore, the phase of the power supply clock signal with the phase period based on the switching frequency is synchronized with the phase of the transmission clock signal in FIG. 6. More specifically, corresponding power supply clock signals fall according to falls of the transmission clock signals, and pulse widths of the power supply clock signals are adjusted such that time differences between the falls of the transmission clock signals and rises of the corresponding power supply clock signals become constant Δt3. A value of the time difference Δt3 can be arbitrarily determined.

Here, the synchronization of the phase of the power supply clock signal with the phase of the transmission clock signal includes not only the case in which the timing of the power supply clock signal coincides with the timing of the transmission clock signal, but also a case in which the power supply clock signal is generated after a lapse of a certain delay time from the transmission clock signal.

When the phase synchronization function is adopted in the color Doppler mode, a pulse Doppler mode, and a simultaneous mode, correlation processing is applied to the reception signal at every transmission timing of the transmission pulse. Therefore, the position of the switching noise is adjusted, and the image noise is removed by the correlation processing. The simultaneous mode denotes a mode for simultaneously observing one of the B mode and the color Doppler mode and the pulse Doppler mode. A blood vessel and a blood flow are specified in one of a B mode image based on the B mode and a color Doppler image based on the color Doppler mode, and a blood flow velocity is displayed in a Doppler image based on the pulse Doppler mode.

In this way, it is possible to remove the image noise of the ultrasonic image, according to the phase synchronization function for synchronizing the phase of the power supply block signal with the phase of the transmission clock signal.

Note that the time difference between the transmission clock signal and the power supply clock signal is not limited to the time difference between the fall of the transmission clock signal and the rise of the power supply clock signal. For example, the time difference between the transmission clock signal and the power supply clock signal may be a time difference between the rise of the transmission clock signal and the rise of the power supply clock signal.

FIG. 7 is a diagram showing an example of a power supply clock signal according to the first embodiment.

FIG. 7 shows two types of power supply clock signals with two types of phase periods. When there are multiple switching power supply circuits 322, each of the switching power supply circuits 322 is controlled by one of the two types of power supply clock signals. The number of switching power supply circuits 322 can be n (n: integer equal to or greater than 2), and the n switching power supply circuits 322 are controlled by p (p≤n, p: integer equal to or greater than 2) types of power supply clock signals.

Alternatively, when there are multiple switching power supply circuits 322, two or more of the switching power supply circuits 322 are controlled by one of the two types of power supply clock signals. The number of controlled circuits among the n switching power supply circuits 322 can be m (integer, 2≤m<n), and the m circuits among the n switching power supply circuits 322 are controlled by q (q≤m, q: integer equal to or greater than 2) types of power supply clock signals.

A first row of each of FIG. 7 illustrates a system synchronization (SYS SYNC) signal for controlling the entire ultrasonic diagnostic apparatus 10. A second row of each of FIG. 7 illustrates a transmission clock (TXCL) signal indicating a transmission timing of the transmission pulse. A third row of each of FIG. 7 is a reception (ECHO) signal based on a reflected wave corresponding to the transmission pulse. A fourth row of each of FIG. 7 illustrates a first power supply clock (DC-CL_1) signal indicating a timing of a first switching operation in the switching power supply circuit 322 (shown in FIG. 1). A fifth row of each of FIG. 7 illustrates a second power supply clock (DC-CL_2) signal indicating a timing of a second switching operation in the switching power supply circuit 322.

The first power supply clock signal and the second power supply clock signal shown in FIG. 7 are based on a same switching frequency, but phases are different. The phases of the first power supply clock signal and the second power supply clock signal are synchronized with the phase of the transmission clock signal. More specifically, intervals of the first power supply clock signals are adjusted such that time differences between falls of the transmission clock signals and rises of corresponding first power supply clock signals become constant Δt1.

Corresponding second power supply clock signals fall according to falls of transmission timings, and pulse widths of the second power supply clock signals are adjusted such that time differences between the falls of the transmission clock signals and rises of the corresponding second power supply clock signals become constant Δt3.

In this way, it is possible to also disperse the generated noise, according to synchronize the phases of the power supply clock signals with different phase periods.

(Modified Example)

The control circuitry 31 (shown in FIG. 1) can also determine whether to adopt the phase synchronization function in each of a mode in which the correlation processing is executed, such as the color Doppler mode, and a mode in which the correlation processing is not executed, such as the B mode. For example, the control circuitry 31 determines not to adopt the phase synchronization function in the B mode selected by the operator through the input circuitry 38. The phase of the power supply clock signal is not synchronized with the phase of the transmission clock signal in the B mode. Therefore, the switching noise is leveled, and it is possible to remove the image noise.

According to the ultrasonic diagnostic apparatus 10 of the first embodiment, the noise mixed always at the same time difference is canceled by the correlation processing in a mode of forming an image by acquiring a relative change between rates, and the noise is not imaged.

According to the ultrasonic diagnostic apparatus 10 of the first embodiment, it is possible to significantly reduce shields and LC components, so it is possible to prevent an increase in the area of substrate and an increase in the cost caused by an increase in the circuit scale.

According to the ultrasonic diagnostic apparatus 10 of the first embodiment, there is no limitation that the transmission timing frequency of the transmission pulse and the operating frequency of the switching power supply become discrete, which occurs in the method of synchronizing the frequencies. Therefore, it is possible to select arbitrary frequencies.

According to the ultrasonic diagnostic apparatus 10 of the first embodiment, the algorithm of frequency calculation is not necessary, and the generation of noise caused by a frequency error does not have to be considered.

2. Second Embodiment

The ultrasonic diagnostic apparatus 10 according to the first embodiment is a technique for synchronizing the timing of the switching operation of the switching power supply circuit with the transmission timing of the ultrasonic pulse. An ultrasonic diagnostic apparatus according to a second embodiment is a technique for synchronizing the timing of the switching operation of the switching power supply circuit with the reception timing of the ultrasonic pulse.

Figure 8:
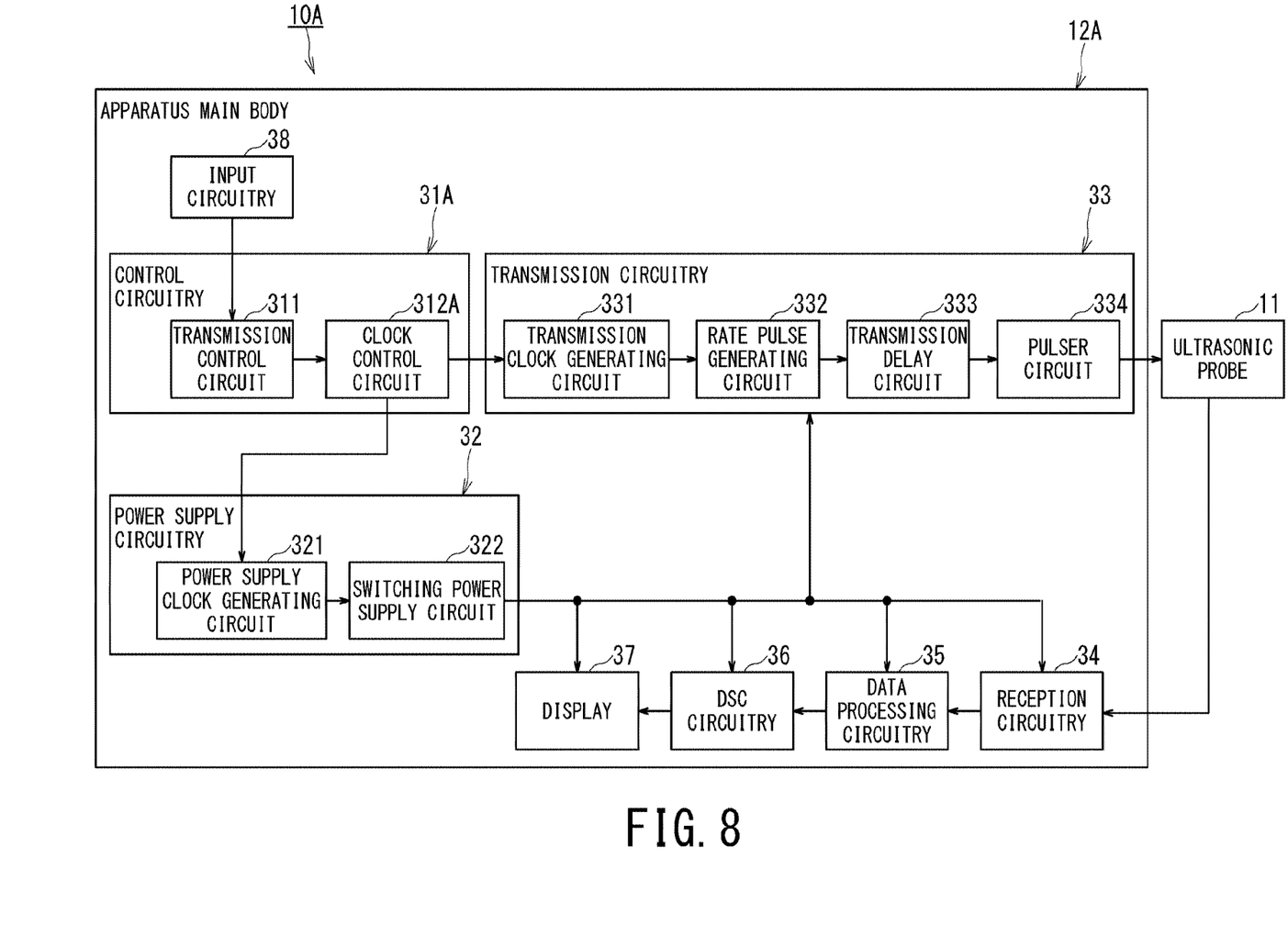
FIG. 8 is a schematic diagram showing a configuration of an ultrasonic diagnostic apparatus according to a second embodiment.

FIG. 8 is a schematic diagram showing a configuration of an ultrasonic diagnostic apparatus according to the second embodiment.

FIG. 8 shows an ultrasonic diagnostic apparatus 10A according to the second embodiment. The ultrasonic diagnostic apparatus 10A includes the ultrasonic probe 11 and an apparatus main body 12A. The apparatus main body 12A is called an ultrasonic diagnostic apparatus in some cases, and in that case, the ultrasonic diagnostic apparatus is connected to an ultrasonic probe provided outside of the ultrasonic diagnostic apparatus.

The apparatus main body 12A includes a control unit (for example, control circuitry) 31A, the power supply unit (for example, power supply circuitry) 32, the transmission unit (for example, transmission circuitry) 33, the reception unit (for example, reception circuitry) 34, the data processing unit (data processing circuitry) 35, the image generating unit (for example, DSC circuitry) 36, the display unit (for example, display) 37, and the input unit (for example, input circuitry) 38.

The control circuitry 31A controls the power supply circuitry 32, the transmission circuitry 33, the reception circuitry 34, the data processing circuitry 35, the DSC circuitry 36, and the display 37 based on various setting requests input by the operator through the input circuitry 38 or various control programs and various data read from an internal memory (not shown). The control circuitry 31A also controls the display 37 to display an ultrasonic image. The control circuitry 31A also controls a memory circuitry (not shown), such as an internal memory, to store the ultrasonic image.

The control circuitry 31A includes the transmission control circuit 311 and a clock control circuit 312A.

The clock control circuit 312A controls the transmission circuitry 33 to repeatedly transmit a transmission pulse based on a transmission clock signal according to the PRF determined by the transmission control circuit 311. The clock control circuit 312A controls the power supply circuitry 32 to synchronize a phase of a power supply clock signal with a phase of a clock signal indicating a reception start timing (hereinafter, called "reception clock signal") after a lapse of a predetermined time difference from the transmission clock signal (hereinafter, called "time difference between transmission and reception"). More specifically, the clock control circuit 312A controls the power supply circuitry 32 to synchronize an initial phase of the power supply clock signal with the reception clock signal.

The time difference between transmission and reception is set in advance. The time difference between transmission and reception is a variable value.

In the ultrasonic diagnostic apparatus 10A shown in FIG. 8, the same reference signs are provided to the same constituent members included in the ultrasonic diagnostic apparatus 10 shown in FIG. 1, and the description will not be repeated.

The power supply clock signal according to the second embodiment will be described with reference to FIGS. 9 and 10.

Figure 9:
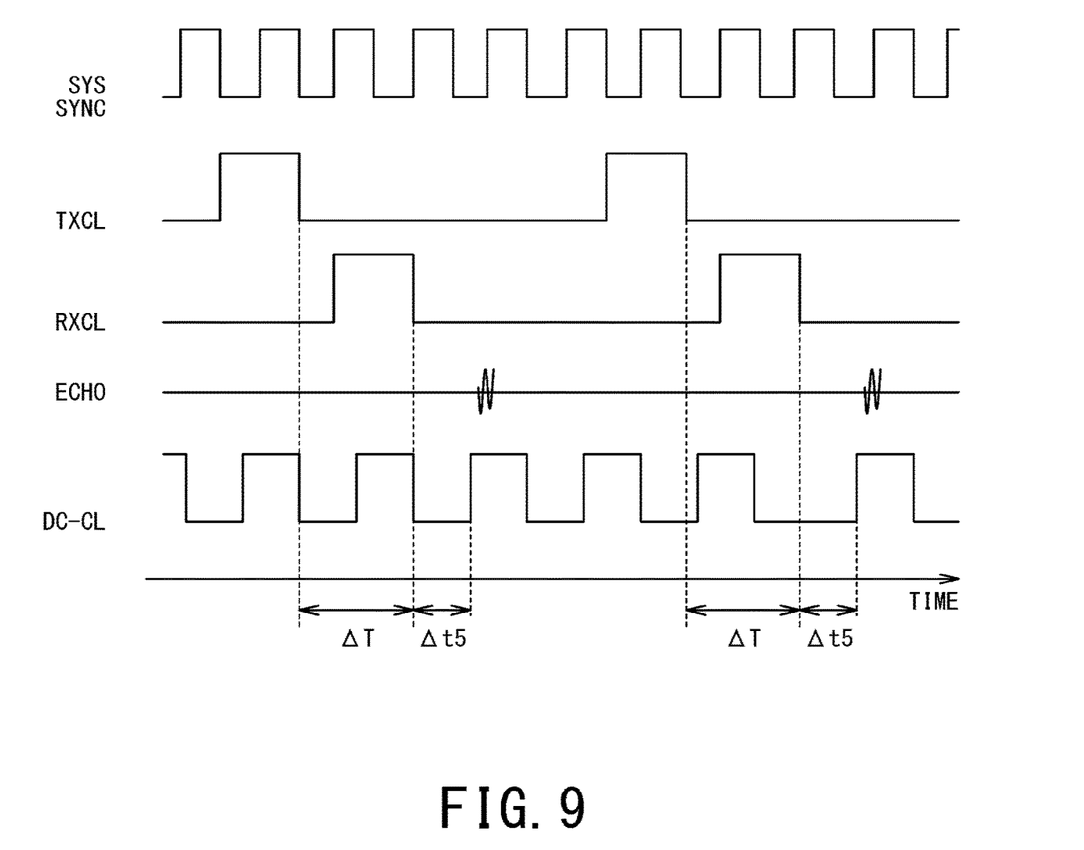
FIG. 9 is a diagram showing an example of a power supply clock signal according to the second embodiment.
Figure 10:
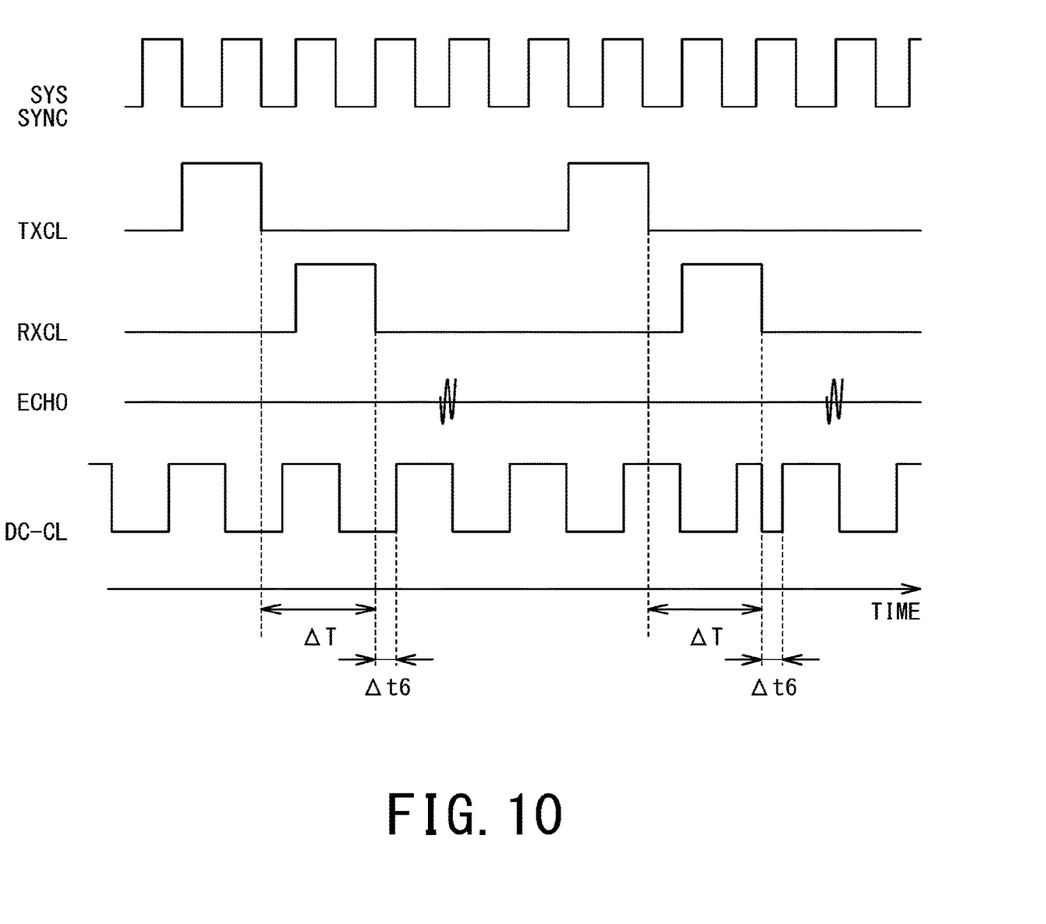
FIG. 10 is a diagram showing an example of a power supply clock signal according to the second embodiment.

Each of FIGS. 9 and 10 is a diagram showing an example of a power supply clock signal according to the second embodiment.

FIGS. 9 and 10 show one type of power supply clock signal with one type of phase period. When there are multiple switching power supply circuits 322, all of the switching power supply circuits 322 are controlled by the one type of power supply clock signal. Alternatively, when there are multiple switching power supply circuits 322, one or more of the switching power supply circuits 322 are controlled by the one type of power supply clock signal.

A third row of each of FIGS. 9 and 10 denotes a reception clock (RXCL) signal indicating the reception start timing of the reflected wave corresponding to the transmission pulse. The other rows of each of FIGS. 9 and 10 are equivalent to those of FIGS. 5 and 6. The reception clock signal is set in advance to fall after a lapse of a time difference $\Delta T$ between transmission and reception after the fall of the transmission clock signal. The time difference $\Delta T$ between transmission and reception is a variable value. When the type of the ultrasonic probe 11 is different, the time difference $\Delta T$ between transmission and reception may be different. For example, the type of the ultrasonic probe 11 is different between a case in which the ultrasonic probe 11 is a convex scanning probe and a case in which the ultrasonic probe 11 is a linear scanning probe.

In FIG. 9, the phase of the power supply clock signal with the phase period based on the switching frequency is synchronized with the phase of the reception clock signal. More specifically, intervals of the power supply clock signals are adjusted such that time differences between falls of the reception clock signals and rises of corresponding power supply clock signals become constant $\Delta t5$. The value of the time difference $\Delta t5$ can be arbitrarily determined. Therefore, the time differences between the falls of the transmission clock signals and the rises of the power supply clock signals are $\Delta T+\Delta t5$.

In FIG. 10, the phase of the power supply clock signal with the phase period based on the switching frequency is synchronized with the phase of the reception clock signal.

More specifically, corresponding power supply clock signals fall according to the falls of the reception clock signals, and pulse widths of the power supply clock signals are adjusted such that time differences between the falls of the reception clock signals and rises of the corresponding power supply clock signals become constant $\Delta t6$. The value of the time difference $\Delta t6$ can be arbitrarily determined. Therefore, the time differences between the falls of the transmission clock signals and the rises of the power supply clock signals are $\Delta T + \Delta t6$.

Here, the synchronization of the phase of the power supply clock signal with the phase of the reception clock signal includes not only the case in which the timing of the power supply clock signal coincides with the timing of the reception clock signal, but also a case in which the power supply clock signal is generated after a lapse of a certain delay time from the reception clock signal.

Note that the time difference $\Delta T$ between transmission and reception is not limited to the time difference between the fall of the transmission clock signal and the rise of the power supply clock signal. For example, the time difference $\Delta T$ between transmission and reception may be a time difference between the rise of the reception clock signal and the rise of the power supply clock signal.

The concept can also be applied to the first power supply clock signal and the second power supply clock signal in the power supply clock signals with different phases. The phases of the first power supply clock signal and the second power supply clock signal are synchronized with the phase of the reception clock signal.

In this way, it is possible to disperse the generated noise, according to synchronize the phases of the power supply clock signals with different phase periods.

According to the ultrasonic diagnostic apparatus 10A of the second embodiment, the same effects as in the ultrasonic diagnostic apparatus 10 of the first embodiment are obtained.

According to the ultrasonic diagnostic apparatus of at least one of the embodiments, it is possible to remove the image noise caused by the switching operation of the switching power supply circuit.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An ultrasonic diagnostic apparatus comprising:
   a transmission circuit configured to repeatedly transmit an ultrasonic pulse through an ultrasonic probe;
   a reception circuit configured to receive, as a reception signal, a reflected wave corresponding to the ultrasonic pulse received through the ultrasonic probe;
   a data processing circuit configured to execute data processing for generating an ultrasonic image based on the reception signal;
   an image generating circuit configured to generate the ultrasonic image based on the reception signal processed by the data processing circuit;
   a switching power supply circuit configured to generate a drive voltage for at least one of the transmission circuit, the reception circuit, the data processing circuit, and the image generating circuit; and
   a control circuit configured to
      control the transmission circuit to repeatedly transmit the ultrasonic pulse, and
      control intervals of power supply clock signals, each indicating a timing of a switching operation of the switching power supply circuit, such that time differences between falls of transmission or reception clock signals, each indicating a transmission or reception timing of the ultrasonic pulse, and rises of corresponding power supply clock signals become constant and are not zero.

2. The ultrasonic diagnostic apparatus according to claim 1, wherein
   the control circuit is configured to
      control the transmission circuit to repeatedly transmit the ultrasonic pulse based on a transmission clock signal that is a clock signal indicating the transmission timing, and
      control the switching power supply circuit to synchronize a phase of a power supply clock signal that is a clock signal indicating the timing of the switching operation, with a phase of the transmission clock signal.

3. The ultrasonic diagnostic apparatus according to claim 2, wherein
   the control circuit is configured to control the switching power supply circuit to synchronize an initial phase of the power supply clock signal with the transmission clock signal.

4. The ultrasonic diagnostic apparatus according to claim 2, wherein
   the control circuit is configured to determine whether a phase synchronization function of synchronizing the phase of the power supply clock signal with the phase of the transmission clock signal is necessary.

5. The ultrasonic diagnostic apparatus according to claim 2, wherein
   the control circuit is configured to adopt the phase synchronization function of synchronizing the phase of the power supply clock signal with the phase of the transmission clock signal in a color Doppler mode and/or a pulse Doppler mode.

6. The ultrasonic diagnostic apparatus according to claim 2, wherein
   the control circuit is configured to control the phase of the power supply clock signal to synchronize the phase with the phase of the transmission clock signal according to a repetition frequency of the ultrasonic pulse.

7. The ultrasonic diagnostic apparatus according to claim 2, wherein
   the control circuit is configured to control a time difference between the transmission clock signal and the power supply clock signal to make the time difference constant.

8. The ultrasonic diagnostic apparatus according to claim 2, wherein
   the control circuit is configured to control the switching power supply circuit to synchronize the phase of the power supply clock signal with a phase period different from the transmission clock signal, with the phase of the transmission clock signal.

9. The ultrasonic diagnostic apparatus according to claim 1, wherein,
   the switching power supply circuit comprises multiple switching power supply circuits, the control circuit is configured to control timings of switching operations corresponding to the multiple switching power supply circuits so that each of the timings is after an elapse of a time difference from the transmission or reception timing.

10. The ultrasonic diagnostic apparatus according to claim 9, wherein
the control circuit is configured to
control the transmission circuit to repeatedly transmit the ultrasonic pulse based on a transmission clock signal that is a clock signal indicating the transmission timing and
control the switching power supply circuit to synchronize phases of power supply clock signals that are clock signals indicating the timings of the switching operations, with a phase of the transmission clock signal.

11. The ultrasonic diagnostic apparatus according to claim 10, wherein
the control circuit is configured to control the phases of the power supply clock signals with different phase periods to synchronize the phases with the phase of the transmission clock signal.

12. The ultrasonic diagnostic apparatus according to claim 10, wherein
the control circuit is configured to control the phases of one or more power supply clock signals of the power supply clock signals to synchronize the phases with the phase of the transmission clock signal.

13. The ultrasonic diagnostic apparatus according to claim 1, further comprising a display configured to display the ultrasonic image, wherein
the switching power supply circuit is configured to generate the drive voltage for at least one of the transmission circuit, the reception circuit, the data processing circuit, and the image generating circuit and for the display.

14. The ultrasonic diagnostic apparatus according to claim 1, wherein
the reception timing is a timing after a lapse of a predetermined time difference from the transmission timing.

15. The ultrasonic diagnostic apparatus according to claim 14, wherein
the control circuit is configured to
control the transmission circuit to repeatedly transmit the ultrasonic pulse based on a reception clock signal that is a clock signal indicating the reception timing, and
control the switching power supply circuit to synchronize a phase of a power supply clock signal that is a clock signal indicating the timing of the switching operation, with a phase of the reception clock signal.

16. A method comprising:
repeatedly transmitting, by a transmission circuit, an ultrasonic pulse through an ultrasonic probe;
receiving, by a reception circuit, as a reception signal, a reflected wave corresponding to the ultrasonic pulse received through the ultrasonic probe;
executing, by a data processing circuit, data processing for generating an ultrasonic image based on the reception signal;
generating, by an image generating circuit, the ultrasonic image based on the reception signal processed by the data processing circuit;
generating, by a switching power supply circuit, a drive voltage for at least one of the transmission circuit, the reception circuit, the data processing circuit, and the image generating circuit;
controlling, by control circuit, the transmission circuit to repeatedly transmit the ultrasonic pulse, and
controlling, by the control circuit, intervals of power supply clock signals, each indicating a timing of a switching operation of the switching power supply circuit, such that time differences between falls of transmission or reception clock signals, each indicating a transmission or reception timing of the ultrasonic pulse, and rises of corresponding power supply clock signals become constant and are not zero.

* * * * *